(12) United States Patent
Abrego et al.

(10) Patent No.: US 7,529,668 B2
(45) Date of Patent: May 5, 2009

(54) SYSTEM AND METHOD FOR IMPLEMENTING A REFINED DICTIONARY FOR SPEECH RECOGNITION

(75) Inventors: Gustavo Abrego, San Jose, CA (US); Lex S. Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 912 days.

(21) Appl. No.: 10/910,394

(22) Filed: Aug. 3, 2004

(65) Prior Publication Data

US 2006/0031070 A1  Feb. 9, 2006

(51) Int. Cl.
  *G10L 15/18*  (2006.01)
  *G10L 15/08*  (2006.01)
  *G10L 15/06*  (2006.01)
  *G10L 15/00*  (2006.01)

(52) U.S. Cl. .................. 704/244; 704/243; 704/257; 704/236

(58) Field of Classification Search ............. 704/8–10, 704/231, 236–245, 251–257, E15.001–E15.005, 704/E15.008–E16.016, E11.001–E11.003
See application file for complete search history.

(56) References Cited

U.S. PATENT DOCUMENTS

| | | | | |
|---|---|---|---|---|
| 4,771,385 A * | 9/1988 | Egami et al. | ............... | 715/236 |
| 5,257,314 A * | 10/1993 | Kimura | ..................... | 704/251 |
| 5,404,299 A * | 4/1995 | Tsurubayashi et al. | ........ | 704/10 |
| 5,497,319 A * | 3/1996 | Chong et al. | ................... | 704/2 |
| 5,642,522 A * | 6/1997 | Zaenen et al. | ............... | 715/246 |
| 5,652,898 A * | 7/1997 | Kaji | ........................... | 704/10 |
| 5,774,588 A * | 6/1998 | Li | ............................. | 382/230 |
| 6,253,169 B1 * | 6/2001 | Apte et al. | .................... | 704/9 |
| 6,757,652 B1 | 6/2004 | Lund et al. | .................. | 704/254 |
| 2001/0053974 A1 * | 12/2001 | Lucke et al. | ................ | 704/240 |

\* cited by examiner

*Primary Examiner*—David R Hudspeth
*Assistant Examiner*—David Kovacek
(74) *Attorney, Agent, or Firm*—Gregory J. Koerner; Redwood Patent Law

(57) ABSTRACT

A system and method for implementing a refined dictionary for speech recognition includes a database analyzer that initially identifies first vocabulary words that are present in a training database and second vocabulary words that are not present in the training database. A relevance module then performs refinement procedures upon the first vocabulary words to produce refined short word pronunciations and refined long word pronunciations that are added to a refined dictionary. A consensus module compares the second pronunciations with calculated plurality pronunciations to identify final consensus pronunciations that are then included in the refined dictionary.

38 Claims, 9 Drawing Sheets

SYSTEM AND METHOD FOR IMPLEMENTING A REFINED DICTIONARY FOR SPEECH RECOGNITION

BACKGROUND SECTION

1. Field of Invention

This invention relates generally to electronic speech recognition systems, and relates more particularly to a system and method for efficiently implementing a refined dictionary for speech recognition.

2. Description of the Background Art

Implementing a robust and effective methodology for system users to interface with electronic devices is a significant consideration of system designers and manufacturers. Voice-controlled operation of electronic devices may often provide a desirable interface for system users to control and interact with electronic devices. For example, voice-controlled operation of an electronic device may allow a user to perform other tasks simultaneously, or may be advantageous in certain types of operating environments. In addition, hands-free operation of electronic systems may also be desirable for users who have physical limitations or other special requirements.

Hands-free operation of electronic devices may be implemented by various speech-activated electronic systems. Speech-activated electronic systems may thus advantageously allow users to interface with electronic devices in situations where it would be inconvenient or potentially hazardous to utilize a traditional input device. However, effectively implementing such speech recognition systems may create substantial challenges for system designers.

For example, enhanced demands for increased system functionality and performance may require more system processing power and require additional hardware resources. An increase in processing or hardware requirements may also result in a corresponding detrimental economic impact due to increased production costs and operational inefficiencies. Furthermore, enhanced system capability to perform various advanced operations may provide additional benefits to a system user, but may also place increased demands on the control and management of various system components. Therefore, for at least the foregoing reasons, implementing a robust and effective method for a system user to interface with electronic devices through speech recognition remains a significant consideration of system designers and manufacturers.

SUMMARY

In accordance with the present invention, a system and method are disclosed for efficiently implementing a refined dictionary for speech recognition. In one embodiment, an initial unrefined dictionary and a training database are provided to an electronic device in any appropriate manner. A training database analyzer then performs a training database analysis procedure to determine whether vocabulary words in the initial unrefined dictionary are present in the training database.

If a given vocabulary word from the initial unrefined dictionary is present in the training database, then the training database analyzer provides all pronunciations for that particular vocabulary word to a relevance module that performs a relevance refinement procedure. If a given vocabulary word from the initial unrefined dictionary is not present in the training database, then the training database analyzer provides all pronunciations for that particular vocabulary word to a consensus module that performs a consensus refinement procedure.

During the relevance refinement procedure, the relevance module initially performs a forced alignment procedure upon the pronunciations received from the training database analyzer for those dictionary words present in the training database. The forced alignment procedure associates speech waveforms of words from the training database with the most closely aligned pronunciations from the initial dictionary. Identifying a most closely aligned pronunciation may be referred to as a pronunciation observation.

The relevance module determines whether each of the received pronunciations from the initial dictionary are observed in the training database. If any received pronunciations are not observed in the training database, then those unobserved pronunciations are discarded or removed from consideration for inclusion in a refined dictionary. If any received pronunciations are observed in the training database, then the relevance module performs a word length analysis on the dictionary words corresponding to the observed pronunciations to thereby divide the dictionary words (and their pronunciations) into either a short word category or a long word category.

The relevance module then performs a cumulative threshold procedure upon the pronunciations for short dictionary words to retain only those pronunciations that cumulatively account for a pre-determined percentage of all pronunciation observations for a given dictionary word. In certain embodiments, a pruning exception is utilized in which any pronunciation with only a single observation is discarded. The relevance module then adds any pronunciations remaining after the cumulative threshold procedure to the refined dictionary.

Similarly, the relevance module performs a standardized distance threshold procedure upon pronunciations for long dictionary words to retain only those pronunciations that have a total number of observations that is greater than a pre-determined standardized threshold value. The relevance module adds any pronunciations remaining after the standardized distance threshold procedure to the refined dictionary.

During the consensus refinement procedure, the consensus module initially performs multiple sequence alignment procedures upon sets of the pronunciations received from the training database analyzer for each of those dictionary words not present in the training database. In certain embodiments, the consensus module performs a multiple sequence alignment procedure by aligning corresponding phonemes (on a phoneme-by-phoneme basis) from each pronunciation for a given dictionary word. The consensus module then compares the corresponding phonemes in each phoneme position of the phoneme strings (pronunciations) to determine whether the aligned phonemes are the same or different.

The consensus module computes a plurality pronunciation for the pronunciations aligned in the foregoing multiple sequence alignment. In certain embodiments, a plurality pronunciation is determined on a phoneme-by-phoneme basis by selecting plurality phonemes that each represent the most frequent phoneme in a given phoneme position from the set of aligned pronunciations. In certain embodiments, if no plurality pronunciation is identified, then a pronunciation for inclusion in the refined dictionary is randomly selected.

The consensus module determines whether the computed plurality pronunciation is a valid pronunciation that is present in the set of pronunciations from the multiple sequence alignment procedure. If the plurality pronunciation is a valid pronunciation, then the consensus module adds that valid plurality pronunciation to the refined dictionary. If the plurality pronunciation is not a valid pronunciation, then the consensus module performs a pair-wise alignment procedure in which the plurality pronunciation is aligned and compared with each pronunciation from the multiple sequence alignment procedure to determine which pronunciations are closest to the plurality pronunciation.

Finally, the consensus module adds one or more of the pronunciations most similar to the plurality pronunciation to the refined dictionary. For at least the foregoing reasons, the present invention therefore provides an improved system and method for efficiently implementing a refined dictionary for speech recognition.

DETAILED DESCRIPTION

The present invention relates to an improvement in speech recognition systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently implementing a refined dictionary for speech recognition, and includes a database analyzer that initially identifies first vocabulary words that are present in a training database, and second vocabulary words that are not present in the training database. A relevance module then performs refinement procedures upon the first vocabulary words to produce refined short word pronunciations and refined long word pronunciations that are added to a refined dictionary. A consensus module compares the second vocabulary words with calculated plurality pronunciations to identify final consensus pronunciations that are then included in the refined dictionary.

Figure 1:
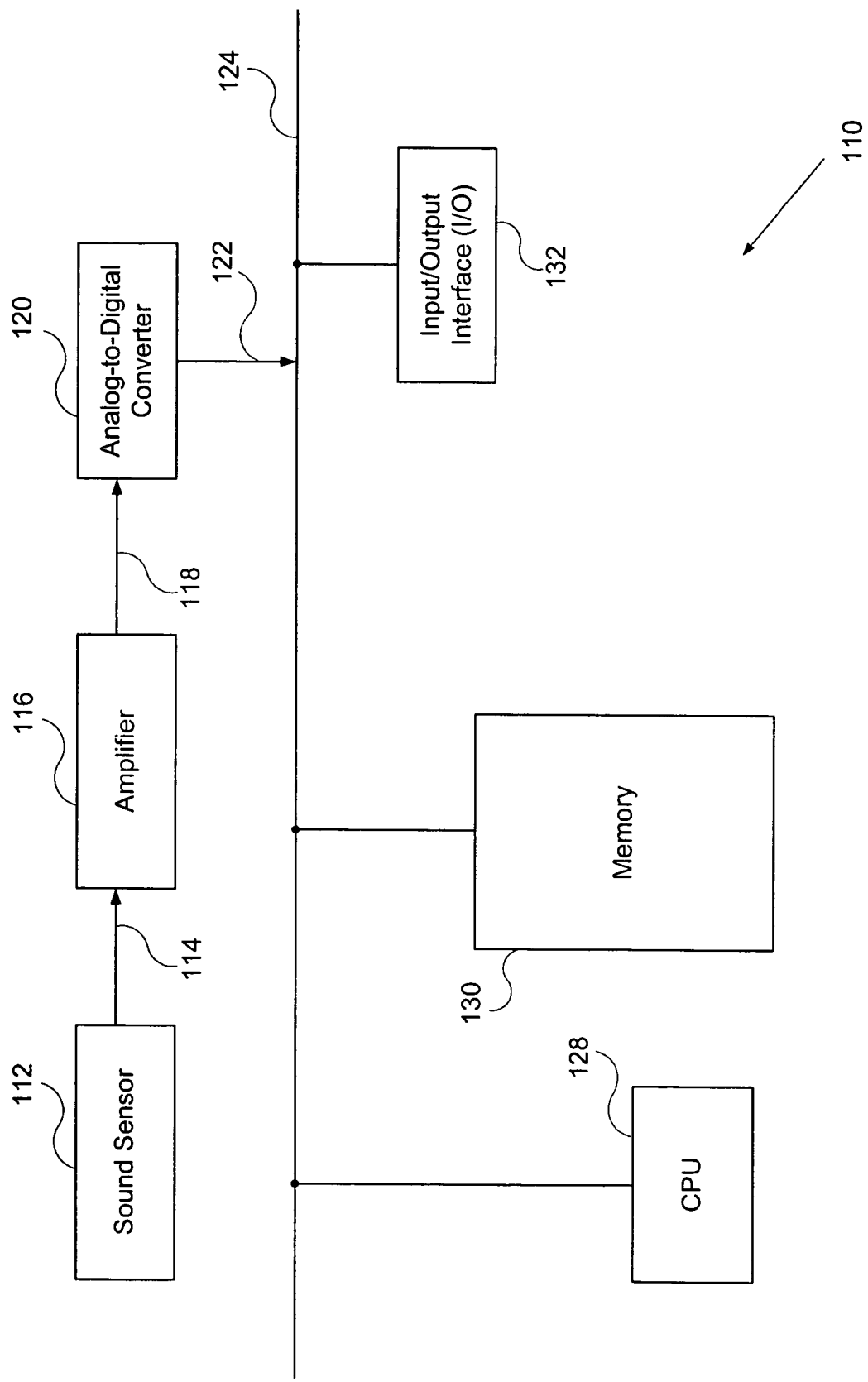
FIG. 1 is a block diagram for one embodiment of an electronic system, in accordance with the present invention.

Referring now to FIG. 1, a block diagram for one embodiment of an electronic system 110 is shown according to the present invention. The FIG. 1 embodiment includes, but is not limited to, a sound sensor 112, an amplifier 116, an analog-to-digital converter 120, a central processing unit (CPU) 128, a memory 130, and an input/output interface 132. In alternate embodiments, electronic system 110 may readily include various other elements or functionalities in addition to, or instead of, certain of those elements or functionalities discussed in conjunction with the FIG. 1 embodiment.

In the FIG. 1 embodiment, sound sensor 112 detects sound energy from spoken speech, and then converts the detected sound energy into an analog speech signal that is provided via path 114 to amplifier 116. Amplifier 116 amplifies the received analog speech signal and provides the amplified analog speech signal via path 118 to analog-to-digital converter 120. Analog-to-digital converter 120 then converts the amplified analog speech signal into corresponding digital speech data and provides the digital speech data via path 122 to system bus 124.

CPU 128 accesses the digital speech data on system bus 124 and responsively analyzes and processes the digital speech data to perform speech recognition procedures according to software instructions contained in memory 130. The operation of CPU 128 and the software instructions in memory 130 are further discussed below in conjunction with FIGS. 2-9. After the speech data has been processed, CPU 128 may then provide the results of the speech recognition to other devices (not shown) via input/output interface 132. In alternate embodiments, the present invention may readily be embodied in various electronic devices and systems other than the electronic system 110 shown in FIG. 1. For example, the present invention may be implemented as part of entertainment robots such as AIBO™ and QRIO™ by Sony Corporation.

Figure 2:
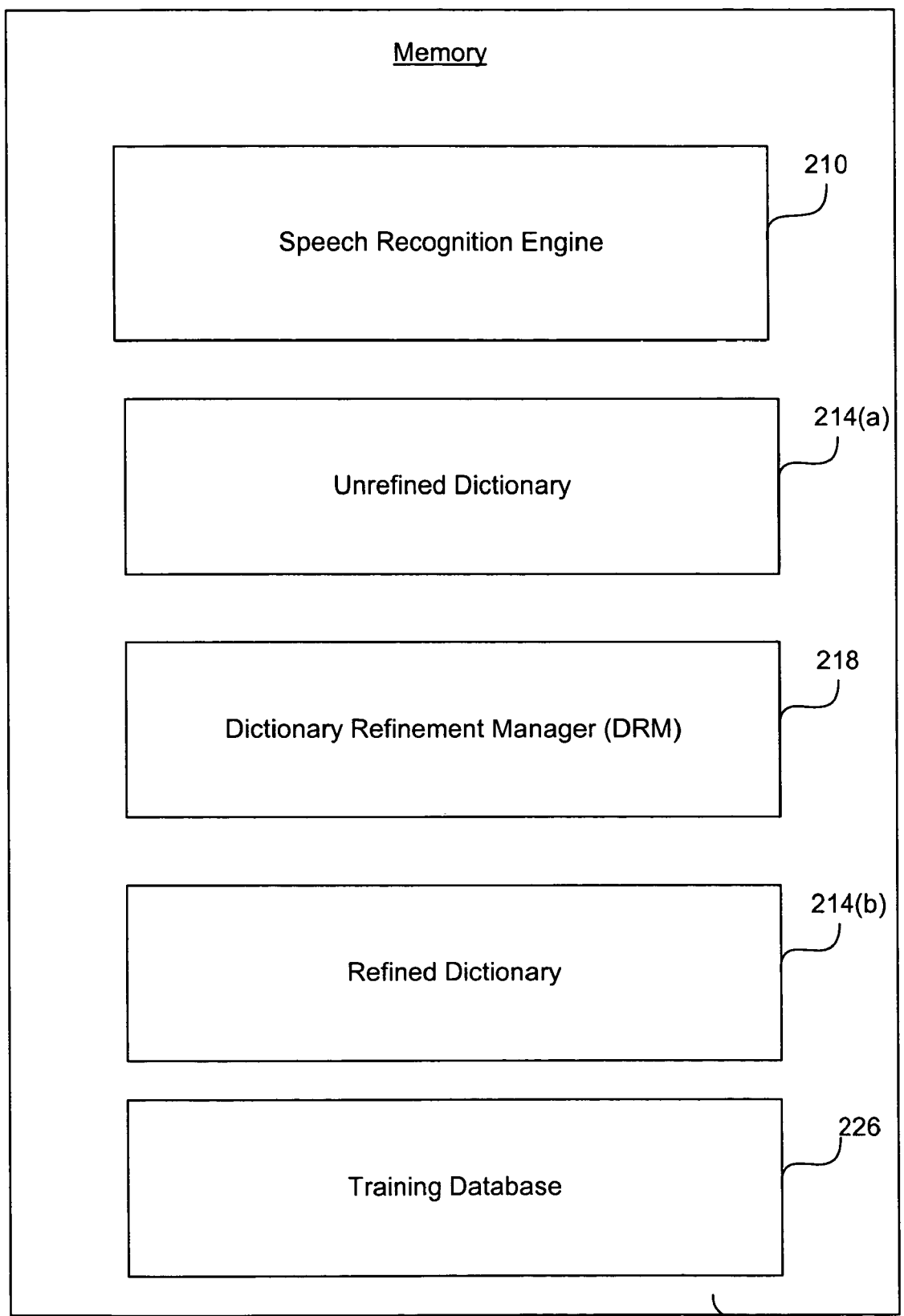
FIG. 2 is a block diagram for one embodiment of the memory of FIG. 1, in accordance with the present invention.

Referring now to FIG. 2, a block diagram for one embodiment of the FIG. 1 memory 130 is shown, according to the present invention. Memory 130 may comprise any desired storage device configurations, including, but not limited to, random access memory (RAM), read-only memory (ROM), and storage devices such as floppy discs or hard disc drives. In the FIG. 2 embodiment, memory 130 includes a speech recognition engine 210, an unrefined dictionary 214(a), a refined dictionary 214(b), a dictionary refinement manager (DRM) 218, and a training database 226. In alternate embodiments, memory 130 may readily include various other elements or functionalities in addition to, or instead of, certain of those elements or functionalities discussed in conjunction with the FIG. 2 embodiment.

In the FIG. 2 embodiment, speech recognition engine 210 includes a series of software modules that are executed by CPU 128 to analyze and recognize input speech data as further described below in conjunction with FIG. 3. In accordance with the present invention, dictionary 214 may be utilized by speech recognition engine 210 to implement the speech recognition functions of the present invention. One embodiment for dictionary 214 is further discussed below in conjunction with FIG. 4.

In the FIG. 2 embodiment, dictionary refinement manager (DRM) 218 includes various modules and other information for performing a refinement procedure to effectively implement a refined dictionary for use in speech recognition. Training database 226 includes a relatively large amount of recorded speech and a corresponding text transcription of the recorded speech. Certain embodiments for the implementation and utilization of dictionary refinement manager 218 are further discussed below in conjunction with FIGS. 5-9.

Figure 3:
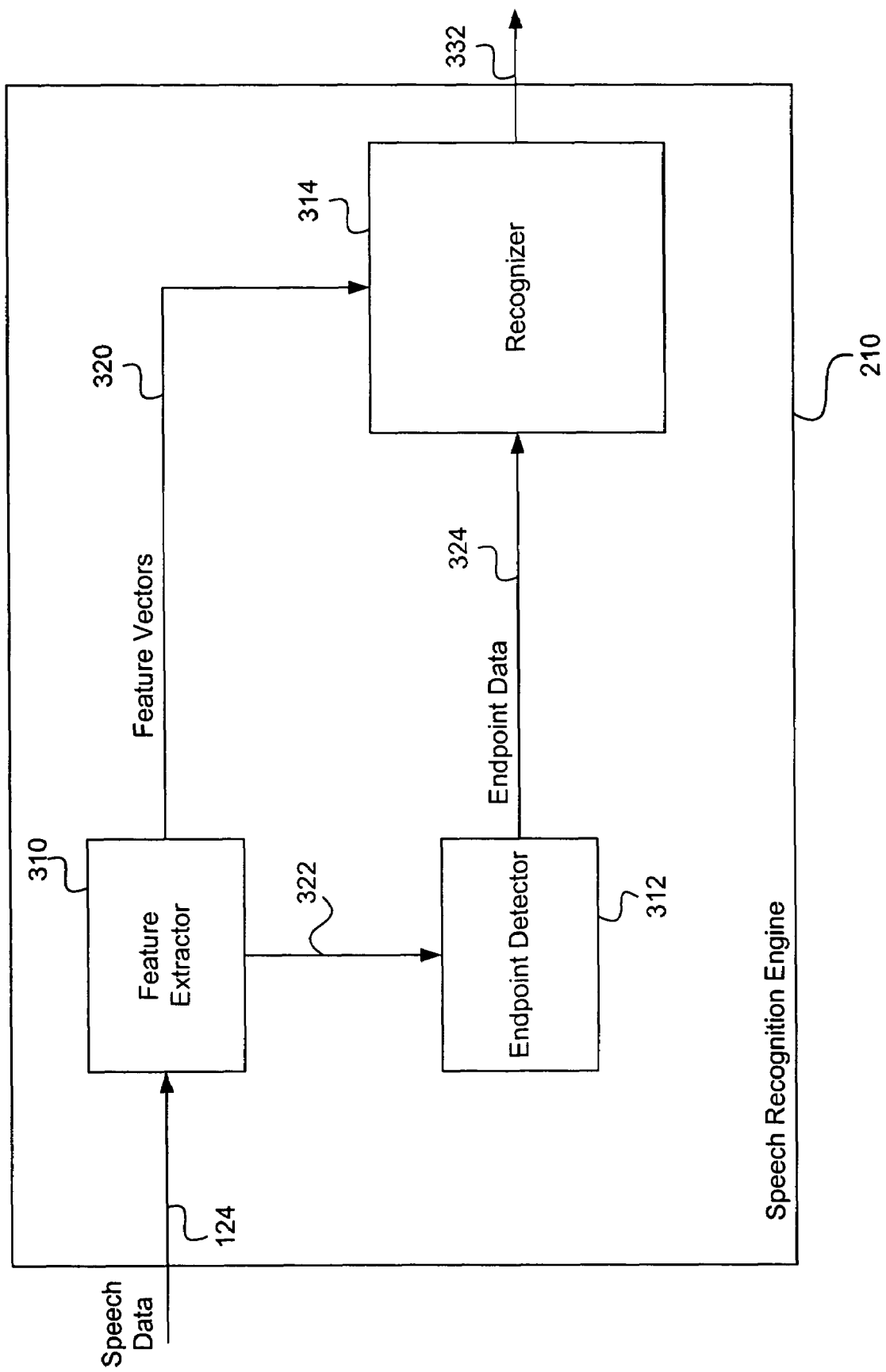
FIG. 3 is a block diagram for one embodiment of the speech recognition engine of FIG. 2, in accordance with the present invention.

Referring now to FIG. 3, a block diagram for one embodiment of the FIG. 2 speech recognition engine 210 is shown according to the present invention. Speech recognition engine 210 may include, but is not limited to, a feature extractor 310, an endpoint detector 312, and a recognizer 314. In alternate embodiments, speech recognition engine 210 may readily include various other elements or functionalities in addition to, or instead of, certain of those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates corresponding representative feature vectors, which are provided to recognizer 314 via path 320. Feature extractor 310 may further provide the speech data to endpoint detector 312 via path 322. Endpoint detector 312 analyzes the speech data and responsively determines endpoints of utterances represented by the speech data. The endpoints indicate the beginning and end in time of an utterance. Endpoint detector 312 may then provide the endpoint data to recognizer 314 via path 324.

Recognizer 314 is configured to recognize words in a pre-determined vocabulary which is represented in dictionary 214 (FIG. 2). The vocabulary in dictionary 214 may correspond to various types of desired information. For example, the vocabulary may include various commands, instructions, or other communications for use by electronic system 110. Recognized vocabulary words may then be output to electronic system 110 via path 332.

In practice, each word from dictionary 214 (FIG. 2) is associated with a corresponding phoneme string (string of one or more individual phonemes) which represents the pronunciation of that word. Trained stochastic representations (such as Hidden Markov Models) for each of the phonemes may be selected and combined to create the phoneme strings to accurately represent pronunciations of words in dictionary 214. Recognizer 314 may then compare input feature vectors from line 320 with the entries (phoneme strings) from dictionary 214 to determine which word produces the highest recognition score. The word corresponding to the highest recognition score may thus be identified as the recognized word.

Figure 4:
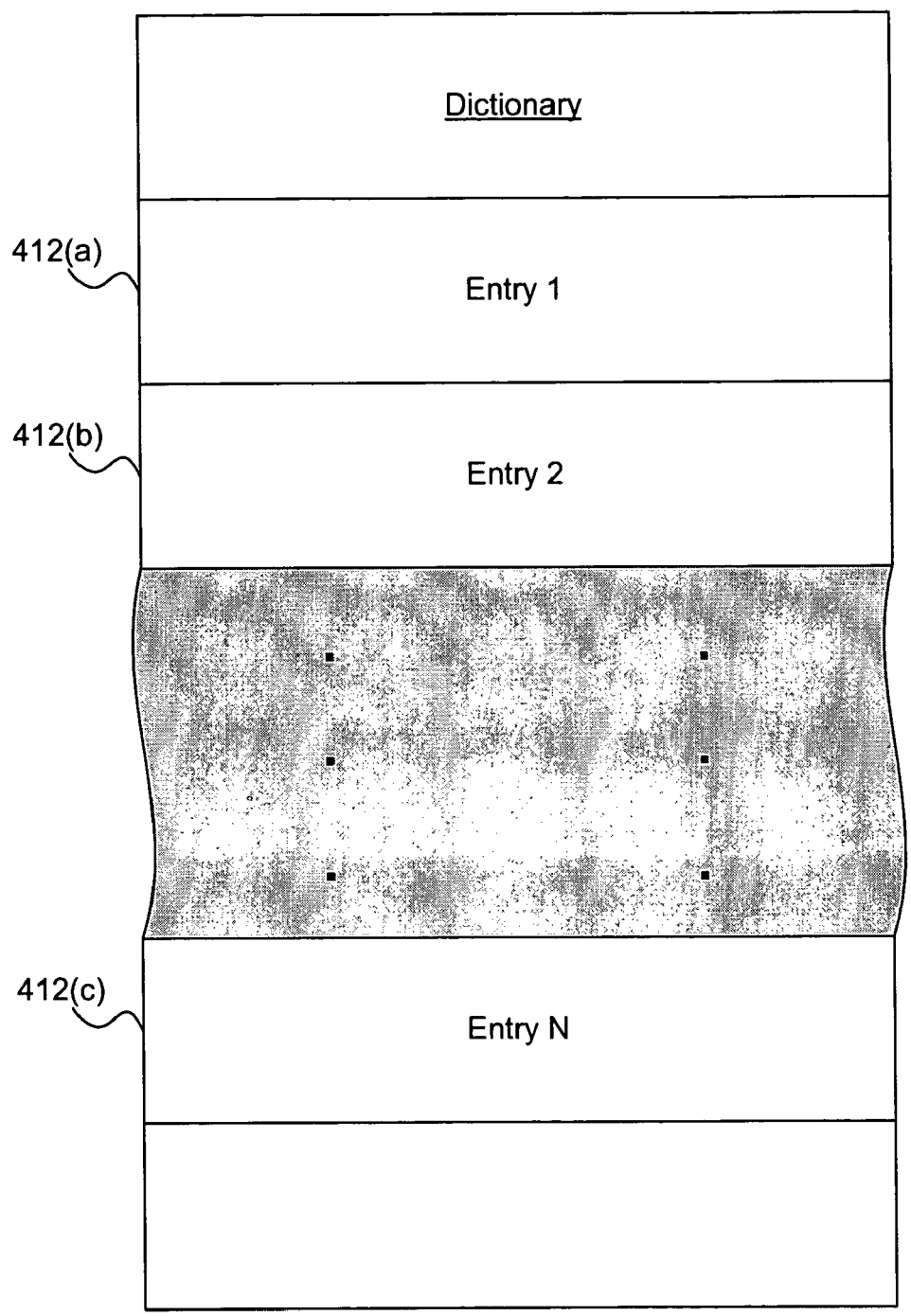
FIG. 4 is a block diagram for one embodiment of the dictionary of FIG. 2, in accordance with the present invention.

Referring now to FIG. 4, a block diagram for one embodiment of the FIG. 2 dictionary 214 is shown, in accordance with the present invention. In the FIG. 4 embodiment, dictionary 214 includes an entry 1 (412(a)) through an entry N (412(c)). In alternate embodiments, dictionary 214 may readily include various other elements or functionalities in addition to, or instead of, certain of those elements or functionalities discussed in conjunction with the FIG. 4 embodiment.

In the FIG. 4 embodiment, dictionary 214 may readily be implemented to include any desired number of entries 412 that may include any desired type of information. In the FIG. 4 embodiment, as discussed above in conjunction with FIG. 3, each entry 412 from dictionary 214 includes vocabulary words and corresponding phoneme strings of individual phonemes (pronunciations) from a pre-determined phoneme set. The individual phonemes of the phoneme strings form sequential representations of the pronunciations of corresponding entries 412 from dictionary 214. In certain embodiments, vocabulary words in dictionary 214 may be represented by multiple pronunciations, so that more than a single entry 412 may correspond to the same vocabulary word. Certain embodiments of a refinement procedure for implementing dictionary 214 are further discussed below in conjunction with FIGS. 5-9.

Figure 5:
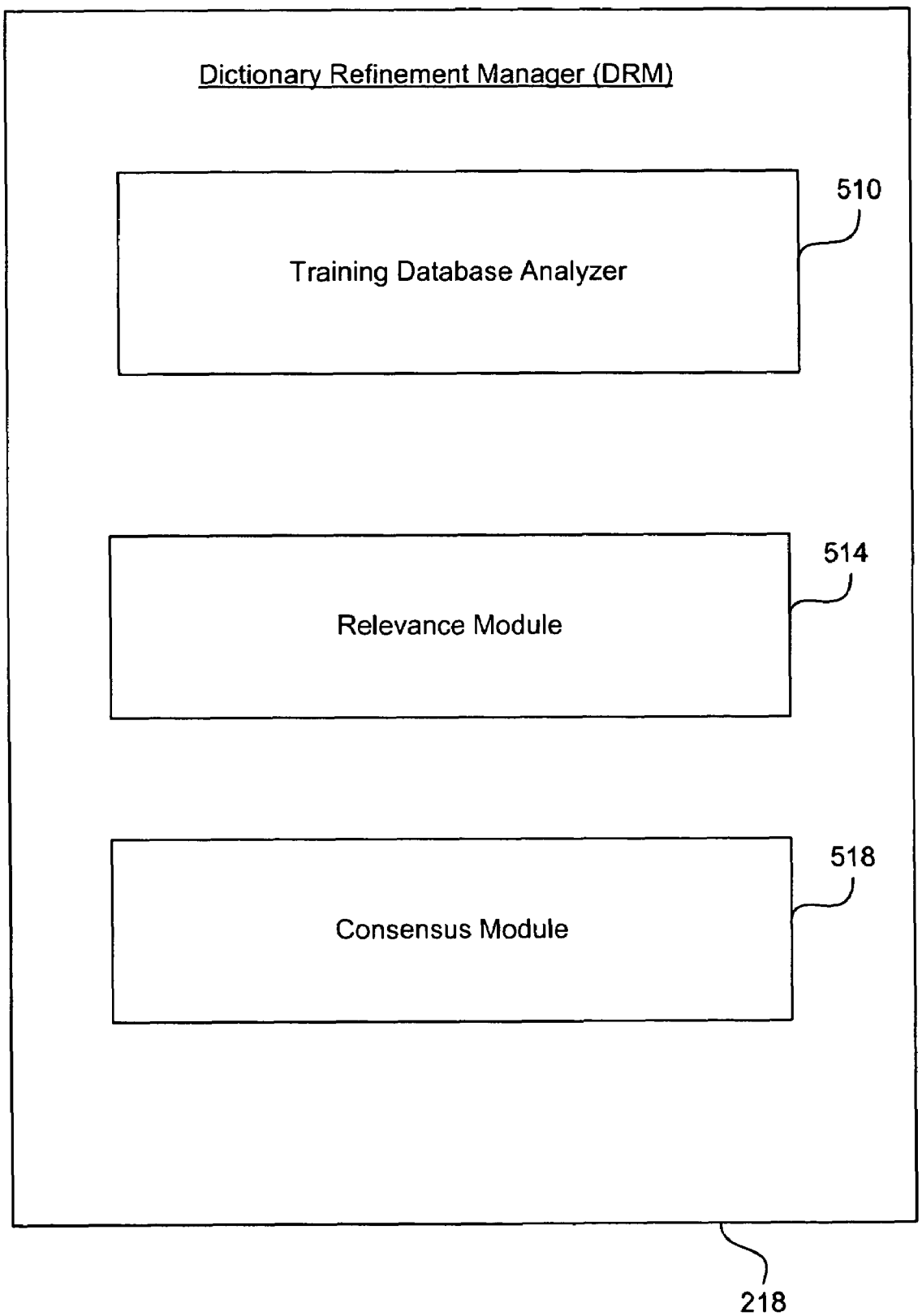
FIG. 5 is a block diagram for one embodiment of the dictionary refinement manager of FIG. 2, in accordance with the present invention.

Referring now to FIG. 5, a block diagram for one embodiment of the FIG. 2 dictionary refinement manager (DRM) 218 is shown according to the present invention. In the FIG. 5 embodiment, DRM 218 includes, but is not limited to, a training database analyzer 510, a relevance module 514, and a consensus module 518. In alternate embodiments, DRM 218 may readily include various other elements and functionalities in addition to, or instead of, certain of those elements or functionalities discussed in conjunction with the FIG. 5 embodiment.

In the FIG. 5 embodiment, DRM 218 utilizes training database analyzer 510 to perform a training database analysis procedure for determining whether entries 412 from an initial unrefined dictionary 214(a) are observed in training database 226. One embodiment for performing a training database analysis procedure is further discussed below in conjunction with FIG. 7. In the FIG. 5 embodiment, DRM 218 utilizes relevance module 514 to perform a relevance procedure for implementing a refined dictionary 214(b). One embodiment for performing a relevance procedure is further discussed below in conjunction with FIG. 8. In the FIG. 5 embodiment, DRM 218 utilizes consensus module 518 to perform a consensus procedure for implementing refined dictionary 214(b). One embodiment for performing a consensus procedure is further discussed below in conjunction with FIG. 9.

Figure 6:
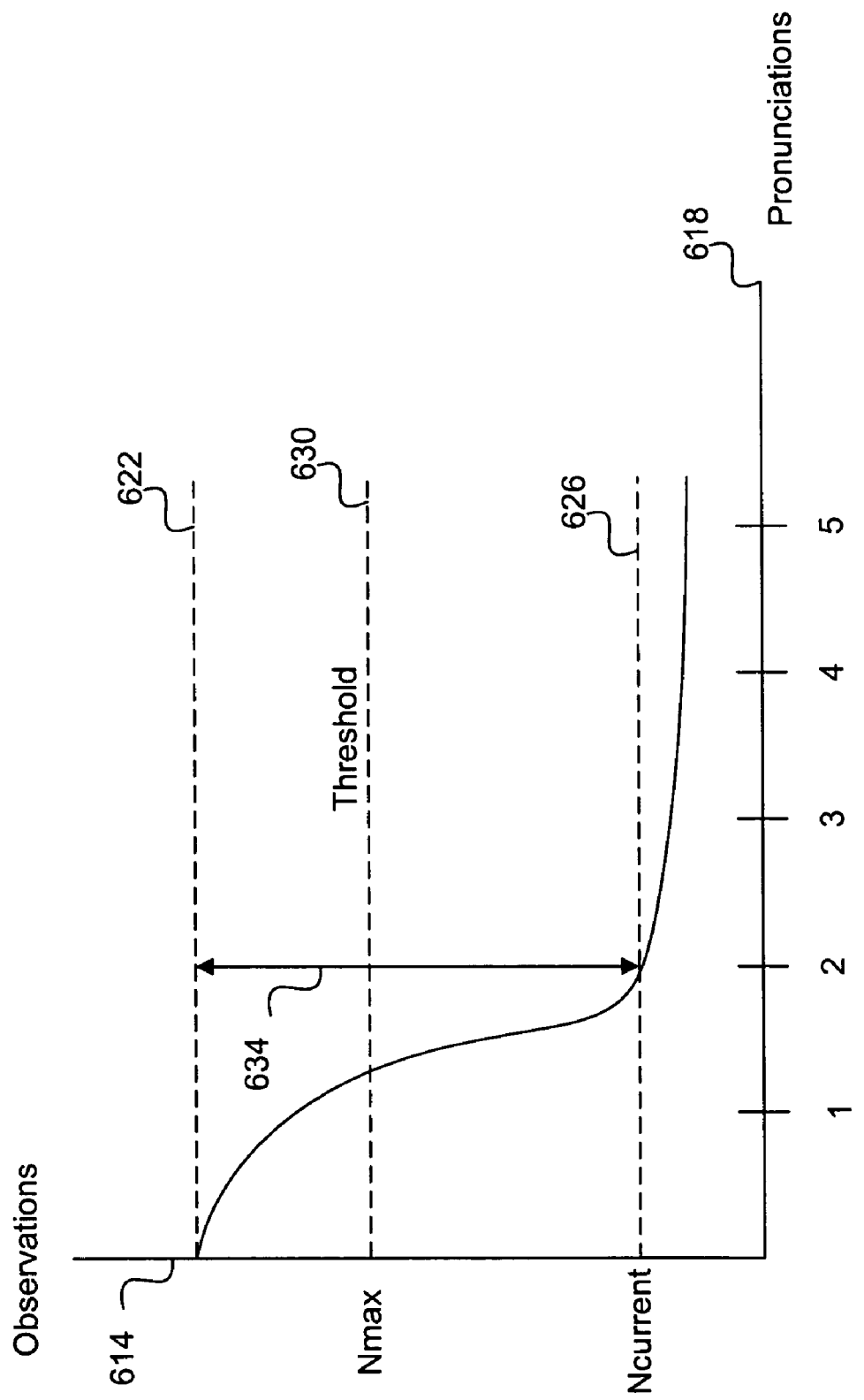
FIG. 6 is a diagram illustrating a standardized distance threshold procedure, in accordance with one embodiment of the present invention.

Referring now to FIG. 6, a standardized distance threshold procedure is shown in accordance with one embodiment of the present invention. The FIG. 6 embodiment is presented for purposes of illustration, and in alternate embodiments the present invention may readily perform standardized distance threshold procedures using various techniques or functionalities in addition to, or instead of, certain of those techniques or functionalities discussed in conjunction with the FIG. 6 embodiment.

In the FIG. 6 embodiment, pronunciations from dictionary 214 are shown on a horizontal axis 618, and total observations (instances) of each of the pronunciations in training database 226 are shown on a vertical axis 614. FIG. 6 also includes a maximum number of observations Nmax (622), a standardized distance threshold 630, exemplary observations Ncurrent (626) for pronunciation 2, and a standardized distance value 634. In accordance with FIG. 6, the standardized distance value is expressed by the following formula:

$$\text{Standardized Distance} = (N\text{max} - N\text{current})/\text{standard deviation}$$

where the standard deviation is a standard deviation of all observations of the pronunciations shown. In accordance with the present invention, relevance module 514 may remove from unrefined dictionary 214(a) any pronunciations with a total number of observations that is less than standardized distance threshold 630. The utilization of a standardized distance threshold procedure in implementing a refined dictionary 214(b) is further discussed below in conjunction with FIG. 8.

Figure 7:
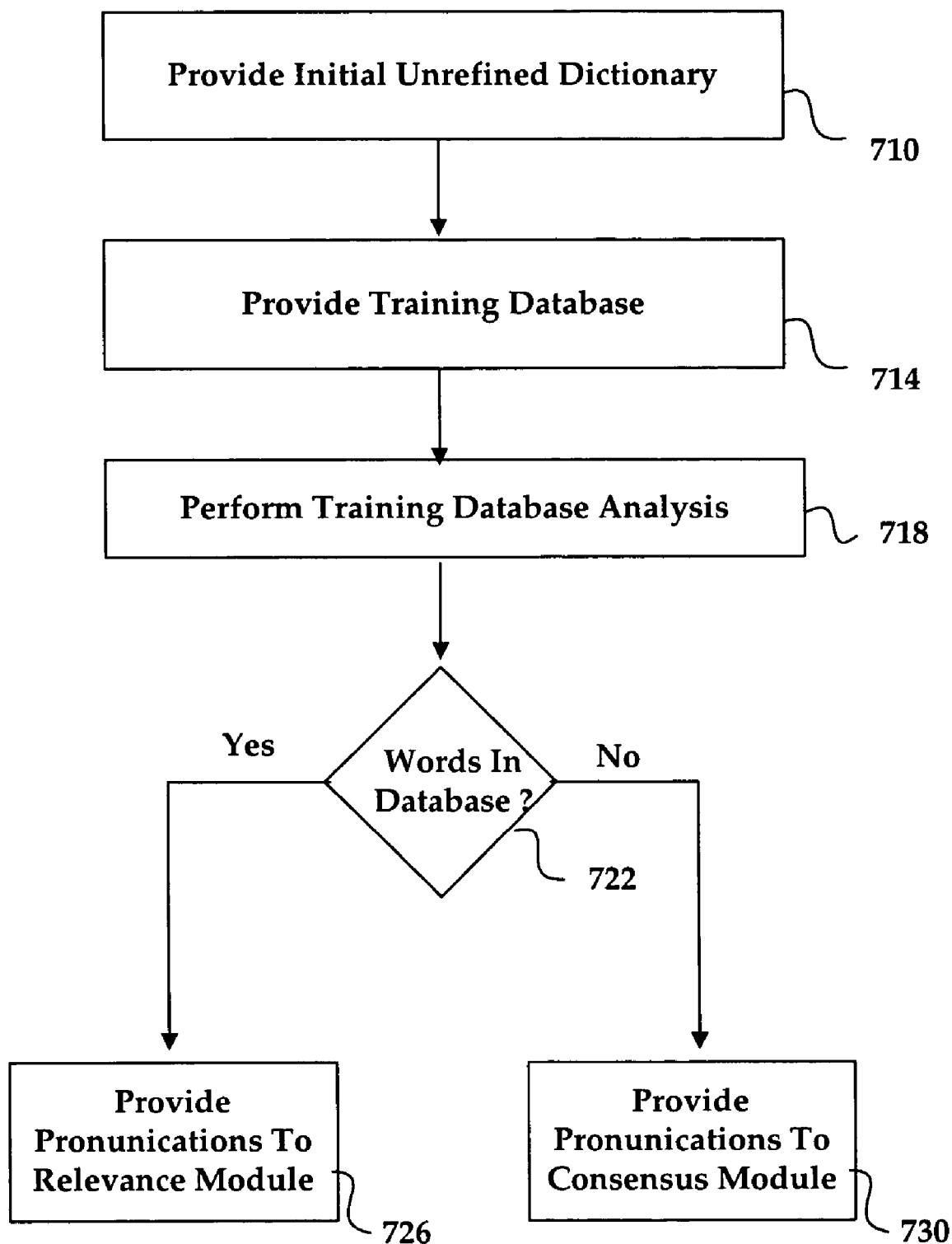
FIG. 7 is a flowchart of method steps for performing a training database analysis procedure, in accordance with the present invention.

Referring now to FIG. 7, a flowchart of method steps for performing a training database analysis procedure is shown in accordance with one embodiment of the present invention. The FIG. 7 flowchart is presented for purposes of illustration, and in alternate embodiments the present invention may readily utilize various steps and sequences other than certain of those discussed in conjunction with the FIG. 7 embodiment.

In the FIG. 7 embodiment, in step 710, an initial unrefined dictionary 214(a) (FIG. 2) may be provided to electronic device 110 in any appropriate manner. Similarly, in step 714, training database 226 (FIG. 2) is provided to electronic device 110 in any appropriate manner. Next, in step 718 and step 722, training database analyzer 510 (FIG. 5) performs a training database analysis procedure to determine whether vocabulary words in the initial unrefined dictionary 214(*a*) are present in training database 226.

If a given vocabulary word from the initial unrefined dictionary 214(*a*) is present in training database 226, then in step 726 training database analyzer 510 provides all pronunciations for that particular vocabulary word to relevance module 514 (FIG. 5) to perform a relevance refinement procedure. If a given vocabulary word from the initial unrefined dictionary 214(*a*) is not present in training database 226, then in step 730 training database analyzer 510 provides all pronunciations for that particular vocabulary word to consensus module 518 (FIG. 5) to perform a consensus refinement procedure. The FIG. 7 procedure then terminates.

Figure 8:
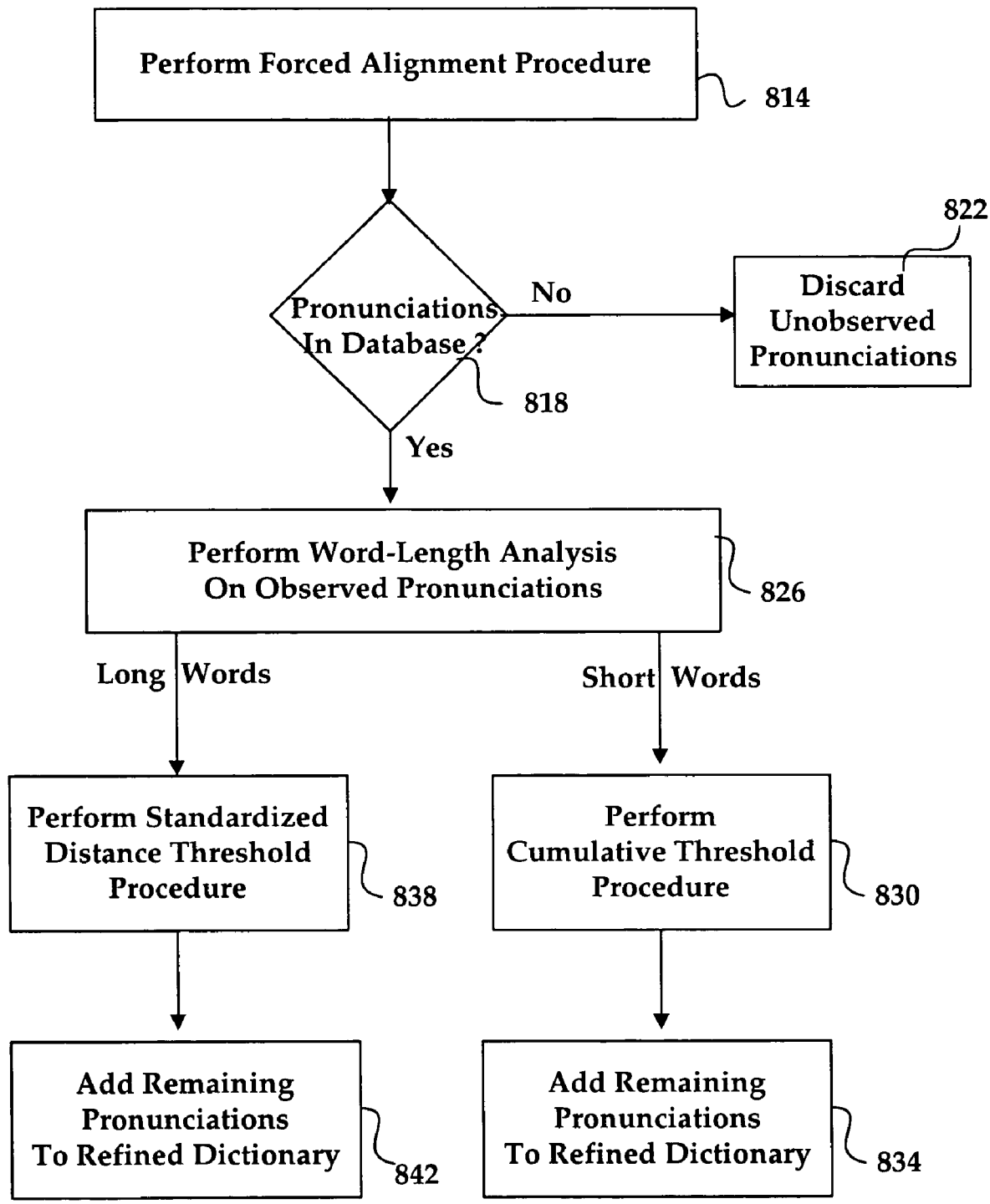
FIG. 8 is a flowchart of method steps for performing a relevance refinement procedure, in accordance with the present invention.

Referring now to FIG. 8, a flowchart of method steps for performing a relevance refinement procedure is shown in accordance with one embodiment of the present invention. The FIG. 8 flowchart is presented for purposes of illustration, and in alternate embodiments, the present invention may readily utilize various steps and sequences other than certain of those discussed in conjunction with the FIG. 8 embodiment.

In the FIG. 8 embodiment, in step 810, relevance module 514 (FIG. 5) performs a forced alignment procedure upon the pronunciations received from training database analyzer 510 for those dictionary words present in training database 226. In the FIG. 8 embodiment, the forced alignment procedure associates speech waveforms of words in training database 226 with the most closely aligned pronunciations in unrefined dictionary 214(*a*). Identifying a most closely aligned pronunciation may be referred to as a pronunciation observation.

In step 818, relevance module 514 determines whether each of the received pronunciations from dictionary 214 are observed in training database 226. If any received pronunciations are not observed in training database 226, then those unobserved pronunciations are removed from consideration for inclusion in refined dictionary 214(*b*).

In step 818, if any received pronunciations are observed in training database 226, then in step 826, relevance module 514 performs a word length analysis on the dictionary words corresponding to the observed pronunciations to thereby divide the dictionary words (and their pronunciations) into either a short word category or a long word category. In accordance with the present invention, short words are presumed to have greater relevance due to greater prevalence in ordinary speech and also due to their greater difficulty in accurate speech recognition. Therefore, pronunciations for the short words are pruned from unrefined dictionary 214(*a*) less aggressively than longer words. The word length analysis may be performed according to any desired length criteria. For example, a total letter threshold for the number of letters in a given word may be used to separate short words from long words.

In step 830, relevance module 514 performs a cumulative threshold procedure upon pronunciations for short dictionary words to retain only those pronunciations that cumulatively account for a pre-determined percentage of all pronunciation observations for a given dictionary word. For example, the cumulative threshold procedure may be performed to retain only those pronunciations that cumulatively account for 95 percent of all pronunciation observations. In certain embodiments, a pruning exception is utilized in which any pronunciation with only a single observation is also discarded. Then, in step 834, relevance module 514 adds any pronunciations remaining after the cumulative threshold procedure to refined dictionary 214(*b*).

In step 838, relevance module 514 performs a standardized distance threshold procedure upon pronunciations for long dictionary words to retain only those pronunciations that have a total number of observations that is greater than a pre-determined standardized threshold value, as discussed above in conjunction with FIG. 6. In the FIG. 8 embodiment, the pre-determined standardized threshold value may be selected to prune pronunciations for long dictionary words more aggressively than the pruning of short words in the cumulative threshold procedure. Finally, in step 842, relevance module 514 adds any pronunciations remaining after the standardized distance threshold procedure to refined dictionary 214(*b*). The FIG. 8 procedure then terminates.

Figure 9:
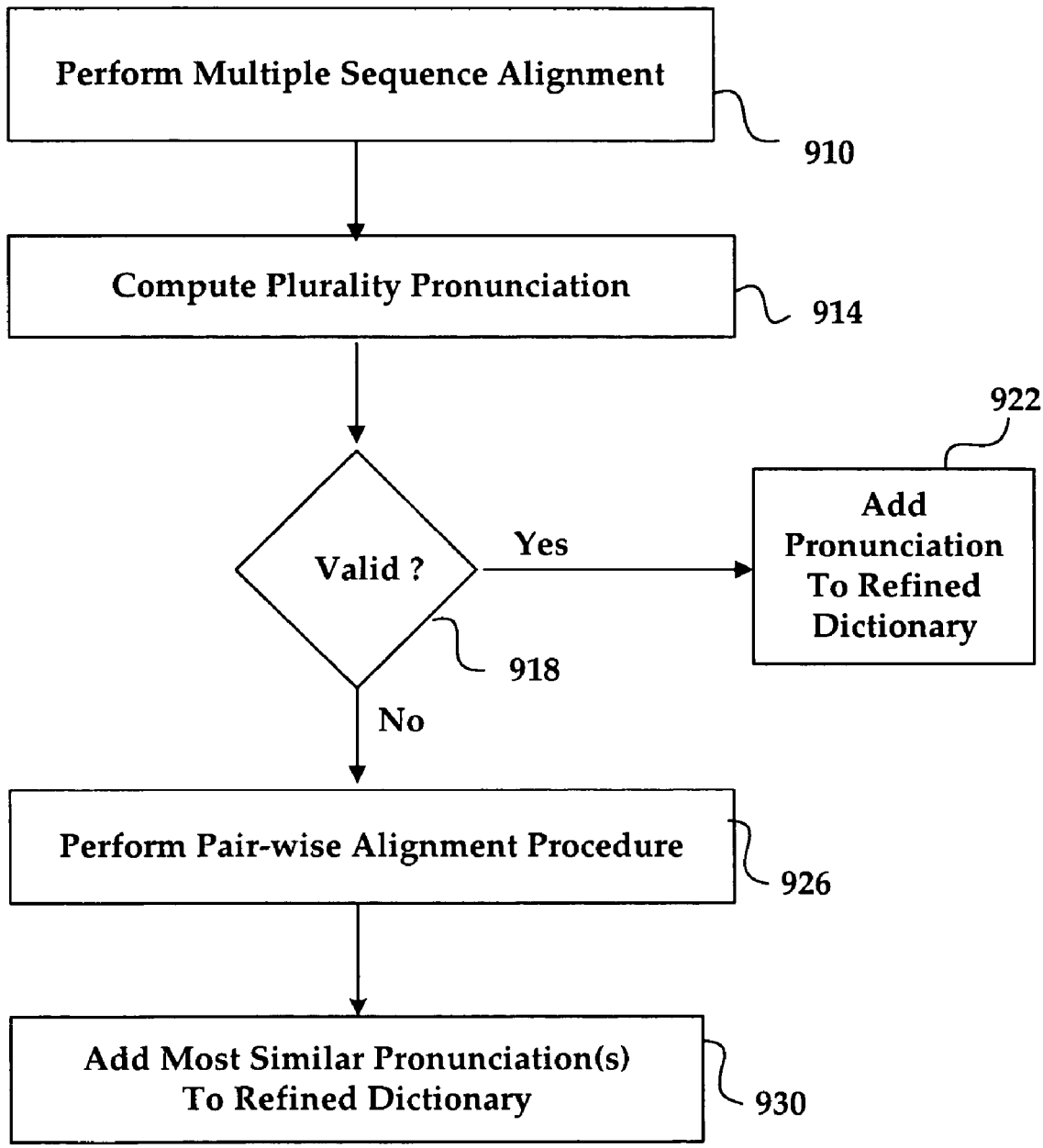
FIG. 9 is a flowchart of method steps for performing a consensus refinement procedure, in accordance with the present invention.

Referring now to FIG. 9, a flowchart of method steps for performing a consensus refinement procedure is shown in accordance with one embodiment of the present invention. In the FIG. 9 embodiment, the consensus refinement procedure is implemented in a more limiting manner than the relevance refinement procedure of FIG. 8 with regard to pruning excessive pronunciations from refined dictionary 214(*b*). The FIG. 9 flowchart is presented for purposes of illustration, and in alternate embodiments the present invention may readily utilize various steps and sequences other than certain of those discussed in conjunction with the FIG. 9 embodiment.

In the FIG. 9 embodiment, in step 910, consensus module 518 (FIG. 5) performs multiple sequence alignment procedures upon sets of the pronunciations received from training database analyzer 510 for each of those dictionary words not present in training database 226. In the FIG. 9 embodiment, consensus module 518 may perform a multiple sequence alignment procedure by aligning corresponding phonemes (on a phoneme-by-phoneme basis) for each pronunciation of a given dictionary word. Consensus module 518 may then compare the corresponding phonemes in each phoneme position of the phoneme strings (pronunciations) to determine whether the aligned phonemes are the same or different.

In step 914, consensus module 518 computes a plurality pronunciation for the pronunciations aligned in the multiple sequence alignment. In the FIG. 9 embodiment, a plurality pronunciation is determined on a phoneme-by-phoneme basis by selecting plurality phonemes that each represent the most frequent phoneme in a given phoneme position from the set of aligned pronunciations. In certain embodiments, if no plurality pronunciation is identified, then a pronunciation for inclusion in the refined dictionary is randomly selected.

In step 918, consensus module 518 determines whether the computed plurality pronunciation is a valid pronunciation that is present in the set of pronunciations from the multiple sequence alignment procedure. If the plurality pronunciation is a valid pronunciation, then in step 922, consensus module 518 adds that valid plurality pronunciation to the refined dictionary 214(*b*).

If, however, in step 918 the plurality pronunciation is not a valid pronunciation, then in step 926 consensus module 518 performs a pair-wise alignment procedure in which the plurality pronunciation is aligned and compared with each pronunciation from the multiple sequence alignment procedure to determine which of one or more pronunciations are closest to the plurality pronunciation. Finally, in step 930 consensus module 518 adds one or more of the pronunciations most similar to the plurality pronunciation to the refined dictionary. The FIG. 9 procedure then terminates. For at least the foregoing reasons, the present invention therefore provides an improved system and method for efficiently implementing a refined dictionary 214(*b*) for speech recognition.

The invention has been explained above with reference to certain preferred embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for performing a speech recognition dictionary refinement procedure, comprising:
    a database analyzer that identifies first vocabulary words that are present in a training database and identifies second vocabulary words that are not present in said training database, said first vocabulary words and said second vocabulary words being from an initial dictionary;
    a relevance module that separates first pronunciations of said first vocabulary words into initial short word pronunciations and initial long word pronunciations, said relevance module performing a cumulative threshold procedure upon said initial short word pronunciations to create final short word pronunciations that are used to populate a refined dictionary, said relevance module performing a standardized distance threshold procedure upon said initial long word pronunciations to create final long word pronunciations that are used to populate said refined dictionary; and
    a consensus module that computes plurality pronunciations for second pronunciations of said second vocabulary words, said consensus module comparing said plurality pronunciations to said second pronunciations to identify final consensus pronunciations that are used to populate said refined dictionary, said consensus module determining whether said plurality pronunciations are validly represented in said second pronunciations.

2. The system of claim 1 further comprising a speech recognition engine that uses said refined dictionary.

3. The system of claim 1 wherein said training database includes recorded speech and corresponding text transcriptions of said recorded speech.

4. The system of claim 1 herein said refined dictionary is implemented as a series of dictionary entries that each include a text vocabulary word and one or more corresponding vocabulary word pronunciations of one or more phonemes.

5. The system of claim 1 wherein said database analyzer performs a training database analysis procedure by searching said training database for said first vocabulary words and said second vocabulary words.

6. The system of claim 1 wherein said relevance module performs a forced alignment procedure upon said first pronunciations to associate database words from said training database with most closely aligned of said first pronunciations.

7. The system of claim 1 wherein said relevance module determines whether said first pronunciations are observed in said training database.

8. The system of claim 7 wherein said relevance module discards any of said first pronunciations that are not observed in said training database.

9. The system of claim 7 wherein said relevance module performs a word length analysis upon said first pronunciations according to pre-defined word length criteria so as to identify said short word pronunciations and said long word pronunciations.

10. The system of claim 1 wherein said relevance module performs said cumulative threshold procedure to retain as said final short word pronunciations only said initial short word pronunciations that cumulatively account for a predetermined percentage of corresponding pronunciation observations from said training database.

11. The system of claim 10 wherein said relevance module utilizes a short word pruning exception during said cumulative threshold procedure in which any initial short word pronunciation with only a single observation in said training database is discarded.

12. The system of claim 1 wherein said relevance module performs said standardized distance threshold procedure by retaining only said initial long word pronunciations that have a total number of observations that is greater than a predetermined standardized threshold value.

13. The system of claim 1 wherein said relevance module calculates a standardized distance according to a formula:

$$\text{Standardized Distance} = (N_{max} - N_{current})/\text{standard deviation}$$

where said $N_{max}$ is a maximum number of pronunciation observations for said first pronunciations in said training dictionary, said $N_{current}$ is a current number of said pronunciation observations for a current one of said first pronunciations, and said standard deviation is a standard deviation of said first pronunciations.

14. The system of claim 1 wherein said consensus module performs multiple sequence alignment procedures by aligning corresponding phonemes from said second pronunciations for each of said second vocabulary words.

15. The system of claim 1 wherein said consensus module computes said plurality pronunciations on a phoneme-by-phoneme basis by selecting plurality phonemes that each represent a respective most frequent phoneme in a given phoneme position from aligned sets of said second pronunciations.

16. The system of claim 1 wherein said consensus module adds said plurality pronunciations to said refined dictionary when said plurality pronunciations are validly represented in said second pronunciations.

17. The system of claim 1 wherein said consensus module performs a pair-wise alignment procedure to compare said plurality pronunciations with said second pronunciations if said plurality pronunciations are not validly represented in said second pronunciations.

18. The system of claim 17 wherein said consensus module selects said final consensus pronunciations by identifying said second pronunciations that are most similar to respective ones of said plurality pronunciations.

19. The system of claim 1 wherein said consensus module discards more of said second pronunciations than said relevance module discards of said first pronunciations, said relevance module discarding more of said initial long word pronunciations than of said initial short word pronunciations.

20. A method for performing a speech-recognition dictionary refinement procedure, comprising:
    utilizing a database analyzer to identify first vocabulary words that are present in a training database, and to identify second vocabulary words that are not present in said training database, said first vocabulary words and said second vocabulary words being from an initial dictionary;

separating first pronunciations of said first vocabulary words into initial short word pronunciations and initial long word pronunciations by utilizing a relevance module that then performs a cumulative threshold procedure upon said initial short word pronunciations to create final short word pronunciations that are used to populate a refined dictionary, said relevance module also performing a standardized distance threshold procedure upon said initial long word pronunciations to create final long word pronunciations that are used to populate said refined dictionary; and computing plurality pronunciations for second pronunciations of said second vocabulary words by utilizing a consensus module that then compares said plurality pronunciations to said second pronunciations to identify final consensus pronunciations that are used to populate said refined dictionary, said consensus module determining whether said plurality pronunciations are validly represented in said second pronunciations.

21. The method of claim 20 further comprising a speech recognition engine that uses said refined dictionary.

22. The method of claim 20 wherein said training database includes recorded speech and corresponding text transcriptions of said recorded speech.

23. The method of claim 20 wherein said refined dictionary is implemented as a series of dictionary entries that each include a text vocabulary word and one or more corresponding vocabulary word pronunciation of one or more phonemes.

24. The method of claim 20 wherein said database analyzer performs a training database analysis procedure by searching said training database for said first vocabulary words and said second vocabulary words.

25. The method of claim 20 wherein said relevance module performs a forced alignment procedure upon said first pronunciations to associate database words from said training database with most closely aligned of said first pronunciations.

26. The method of claim 20 wherein said relevance module determines whether said first pronunciations are observed in said training database.

27. The method of claim 26 wherein said relevance module discards any of said first pronunciations that are not observed in said training database.

28. The method of claim 26 wherein said relevance module performs a word length analysis upon said first pronunciations according to pre-defined word length criteria so as to identify said short word pronunciations and said long word pronunciations.

29. The method of claim 20 wherein said relevance module performs said cumulative threshold procedure to retain as said final short word pronunciations only said initial short word pronunciations that cumulatively account for a predetermined percentage of corresponding pronunciation observations from said training database.

30. The method of claim 29 wherein said relevance module utilizes a short word pruning exception during said cumulative threshold procedure in which any initial short word pronunciation with only a single observation in said training database is discarded.

31. The method of claim 20 wherein said relevance module performs said standardized distance threshold procedure by retaining only said initial long word pronunciations that have a total number of observations that is greater than a predetermined standardized threshold value.

32. The method of claim 20 wherein said relevance module calculates a standardized distance according to a formula:

$$\text{Standardized Distance} = (N_{max} - N_{current})/\text{standard deviation}$$

where said $N_{max}$ is a maximum number of pronunciation observations for said first pronunciations in said training dictionary, said $N_{current}$ is a current number of said pronunciation observations for a current one of said first pronunciations, and said standard deviation is a standard deviation of said first pronunciations.

33. The method of claim 20 wherein said consensus module performs multiple sequence alignment procedures by aligning corresponding phonemes from said second pronunciations for each of said second vocabulary words.

34. The method of claim 20 wherein said consensus module computes said plurality pronunciations on a phoneme-by-phoneme basis by selecting plurality phonemes that each represent a respective most frequent phoneme in a given phoneme position from aligned sets of said second pronunciations.

35. The method of claim 20 wherein said consensus module adds said plurality pronunciations to said refined dictionary when said plurality pronunciations are validly represented in said second pronunciations.

36. The method of claim 20 wherein said consensus module performs a pair-wise alignment procedure to compare said plurality pronunciations with said second pronunciations if said plurality pronunciations are not validly represented in said second pronunciations.

37. The method of claim 36 wherein said consensus module selects said final consensus pronunciations by identifying said second pronunciations that are most similar to respective ones of said plurality pronunciations.

38. The method of claim 20 wherein said consensus module discards more of said second pronunciations than said relevance module discards of said first pronunciations, said relevance module discarding more of said initial long word pronunciations than of said initial short word pronunciations.

* * * * *